United States Patent
Shen et al.

(10) Patent No.: US 12,368,472 B2
(45) Date of Patent: Jul. 22, 2025

(54) AUTOMATIC SIGNAL DEPLOYER, SIGNAL DEPLOYMENT SYSTEM, AUTOMATIC SIGNAL PATH DEPLOYMENT METHOD, AND BEHAVIOR CONTROL SIGNAL GENERATION METHOD OF DEPLOYMENT AGENT

(71) Applicant: FAR EASTONE TELECOMMUNICATIONS CO., LTD., Taipei (TW)

(72) Inventors: Li-Hsiang Shen, Hsinchu (TW); Kai-Ten Feng, Hsinchu (TW); Chun-Chieh Kuo, New Taipei (TW); Hua-Pei Chiang, Taipei (TW); Chyi-Dar Jang, Taipei (TW); Teng-Chieh Yang, New Taipei (TW); Tsung-Jen Wang, Taipei (TW); Chi-Hung Lin, New Taipei (TW); Chi-En Chien, New Taipei (TW)

(73) Assignee: FAR EASTONE TELECOMMUNICATIONS CO., LTD., Taipei (TW)

(*) Notice: Subject to any disclaimer, the term of this patent is extended or adjusted under 35 U.S.C. 154(b) by 78 days.

(21) Appl. No.: 18/505,254

(22) Filed: Nov. 9, 2023

(65) Prior Publication Data
US 2024/0250719 A1    Jul. 25, 2024

Related U.S. Application Data

(60) Provisional application No. 63/480,764, filed on Jan. 20, 2023.

(51) Int. Cl.
  *H04B 7/04* (2017.01)
  *H04B 17/391* (2015.01)
(52) U.S. Cl.
  CPC ..... *H04B 7/04013* (2023.05); *H04B 17/3913* (2015.01)
(58) Field of Classification Search
  CPC ........... H04B 7/04013; H04B 17/3913; H04W 24/02; H04W 84/047
  See application file for complete search history.

(56) References Cited

U.S. PATENT DOCUMENTS

2010/0278136 A1* 11/2010 Oyman ............... H04W 52/146
                                                    370/330
2023/0040183 A1*  2/2023 Xu ....................... H04B 17/318

* cited by examiner

Primary Examiner — Sung S Ahn
(74) Attorney, Agent, or Firm — Muncy, Geissler, Olds & Lowe, P.C.

(57) ABSTRACT

The present invention discloses an automatic signal deployer, a signal deployment system, an automatic signal path deployment method, and a behavior control signal generation method of a deployment agent. The signal deployment system includes an automatic signal deployer, a deployment agent and a base station. The deployment agent receives signal quality data, generates a behavior control signal according to the signal quality data, and sends out the behavior control signal to the automatic signal deployer. The automatic signal deployer receives the behavior control signal and a source signal coming from the base station, performs deployment according to the behavior control signal, whereby the automatic signal deployer can transmit the source signal toward a signal path allocation direction and complete automatic deployment of signal paths.

11 Claims, 8 Drawing Sheets

AUTOMATIC SIGNAL DEPLOYER, SIGNAL DEPLOYMENT SYSTEM, AUTOMATIC SIGNAL PATH DEPLOYMENT METHOD, AND BEHAVIOR CONTROL SIGNAL GENERATION METHOD OF DEPLOYMENT AGENT

BACKGROUND OF THE INVENTION

Field of the Invention

The present invention relates to a wireless communication technology, particularly to an automatic signal deployer, a signal deployment system, an automatic signal path deployment method, and a behavior control signal generation method of a deployment agent.

Description of the Prior Art

In 5G wireless communication, the millimeter-wave frequency band is a critical factor of high-speed service. In addition to providing high-speed service, the millimeter-wave frequency band also provides broader bandwidth to make the network able to process more data and respond fast. Through high-speed data transmission and broader bandwidth, the millimeter-wave communication technology can greatly reduce communication delay, whereby the applications needing instant response can operate smoother, such as telemedicine, games, and automatic driving. However, the millimeter-wave communication technology also confronts some challenges. The wavelength of the millimeter wave is very short, and the transmission distance thereof is limited. More base stations are required to cover the area originally covered by a single base station in the 4G communication technology. Thus, the deployment of the communication networks becomes more difficult and expensive in 5G wireless communication. Besides, millimeter waves are very likely to be blocked by barriers, such as buildings, trees, and vehicles. Thus, 5G communication may be interrupted by barriers and impaired in environments of non-line-of-sight (NLOS) wireless transmission. Therefore, 5G communication needs line-of-sight (LOS) wireless transmission in many situations.

Signal path redistributors (SPR) may be used to assist in NLOS problems. Signal path redistributors, like base stations or relay stations, are normally installed on buildings having sufficient height and better view field, whereby signal path redistributors can reflect/refract/relay high-frequency signals, such as millimeter waves, hypo-terahertz waves, terahertz waves, and visible lights, to the required direction. Besides, a signal path redistributor does not consume power. Therefore, signal path redistributors are suitable to function as wireless communication devices to increase the coverage and throughput of 5G millimeter-wave communication.

At present, signal path redistributors still have many problems to overcome. Most of the deployment schemes of the signal path redistributors are mainly for outdoor environments; few of them are for indoor applications. In an indoor application, while a user device moves or changes its position, the signal path redistributor has to adjust its transmission direction persistently to guarantee the continuation of signal transmission. In another indoor application, while a user enters different rooms, the partition walls thereof will hinder the millimeter-wave signals. However, adjusting of the transmission direction of a single signal path redistributor is unlikely to cover the user devices in different rooms. Therefore, it is necessary to separately dispose different signal path redistributors in different positions to make all the rooms covered by millimeter-wave signals.

Nevertheless, disposing signal path redistributors in an indoor environment may encounter many difficulties. For an example, the host may be unwilling to dispose signal path redistributors because the signal path redistributors impair the aesthetics of interior space or because the interior space is insufficient for the signal path redistributors. For another example, a larger indoor space, such as a department store or a large office, has many partitions and barriers and needs a lot of signal path redistributors to make millimeter-wave signals cover the total space; the deployment cost thereof would be very high. Therefore, the manufacturers are eager to solve the problem: how the signal path redistributors can direct the signals to the target user devices correctly in an indoor space inexpensively.

SUMMARY OF THE INVENTION

Considering the conventional technical problems, one objective of the present invention is to provide a low-cost solution for a signal path redistributor, wherein the signal path redistributor can adjust the transmission direction according to the position of a user device to enable the user device to achieve a better signal transmission effect.

According to the objective of the present invention, the present invention provides an automatic signal deployer, which comprises a self-propelled carrier, a signal path redistributor, a multidirectional adjusting device, a wireless transceiver, and a controller. The multidirectional adjusting device is connected with the signal path redistributor and the self-propelled carrier. The controller is connected with the self-propelled carrier, the multidirectional adjusting device, and the wireless transceiver. The wireless transceiver receives a behavior control signal and transmits the behavior control to the controller. The controller receives the behavior control signal and analyzes the behavior control signal to generate a carrier behavior signal and adjust one of a behavior adjusting signal and a mode adjusting signal, or a combination thereof. The controller transmits the carrier behavior signal to the self-propelled carrier. The self-propelled carrier moves in the space according to the carrier behavior signal. The controller transmits the mode-adjusting signal to the signal path redistributor. The signal path redistributor switches to one of a reflection mode, a refraction mode and a relay transmission mode or simultaneously switches to more than two of them according to the mode adjusting signal. The controller transmits the behavior control signal to the multidirectional adjusting device. According to the behavior control signal, the multidirectional adjusting device adjusts the signal path allocation direction of the signal path redistributor to enable the signal path redistributor to send the source signal toward the signal path allocation direction.

In one embodiment, the behavior adjusting signal includes azimuth angle adjusting information, elevation angle adjusting information, and height adjusting information. The multidirectional adjusting device includes an azimuth angle adjuster, an elevation angle adjuster, and a height lifter. One end of the height lifter is connected with the self-propelled carrier; another end of the height lifter is connected with the azimuth angle adjuster. The elevation angle adjuster is connected with the azimuth angle adjuster. The azimuth angle adjuster is connected with the signal path redistributor. The height lifter receives the height adjusting information and adjusts the height of the signal path redistributor according to the height adjusting information. The azimuth angle adjuster receives the azimuth angle adjusting information and adjusts the azimuth angle of the signal path redistributor according to the azimuth angle adjusting information. The elevation angle adjuster receives the elevation angle adjusting information and adjusts the elevation angle of the signal path redistributor according to the elevation angle adjusting information.

According to the objective of the present invention, the present invention also provides a signal deployment system, which comprises an automatic signal deployer, a deployment agent, and a base station. The deployment agent receives signal quality information, generates a behavior control signal according to the signal quality information, and then transmits the behavior control signal to the automatic signal deployer. The automatic signal deployer receives the behavior control signal and the source signal. According to the behavior control signal, the automatic signal deployer moves to an assigned position and switches to one of a reflection mode, a refraction mode and a relay transmission mode or simultaneously switches to more than two of them. The automatic signal deployer adjusts the signal path allocation direction to enable the automatic signal path redistributor to send the source signal, which is emitted by the base station, toward the signal path allocation direction.

In one embodiment, the deployment agent receives signal quality data through user devices or through the base station.

In one embodiment, the signal quality data include a plurality of pieces of signal quality information, such as one of Received-Signal Strength Indicator (RSSI), Signal-to-Noise Ratio (SNR), Signal to Interference plus Noise Ratio (SINR), Reference Signal Received Power (RSRP), Reference Signal Received Quality (RSRQ), Bit Error Rate (BER), Packet Error Rate (PER), and Packet Drop Rate (PDR).

In one embodiment, the deployment agent uses the signal averages, which are calculated from a plurality of pieces of signal quality information, as the reward values of a plurality of the sub-agents of the reinforcement learning algorithm of the multi-agent system. The deployment agent makes the plurality of sub-agents use the rewards to generate and send out behavior control signals. After the automatic signal deployer transmits the source signal, which comes from the base station, toward the direction of the signal path allocation, the deployment agent receives new signal quality data. After the new signal quality data has achieved the requirement of deployment, the deployment agent stops sending out behavior control signals.

In one embodiment, before the new signal quality data reach the requirement of deployment, the deployment agent resumes to undertake the steps beginning from the step of receiving signal quality data until the new signal quality data have achieved the requirement of deployment.

According to the objective of the present invention, the present invention also provides an automatic signal path deployment method, which is applied to a signal deployment system and comprises steps: the deployment agent receives signal quality data, including a plurality of pieces of signal quality information; the deployment agent generates a behavior control signal according to the plurality of pieces of signal quality information and sends out the behavior control signal; the automatic signal deployer receives the behavior control signal, moves to an assigned position according to the behavior control signal, adjusts the direction of signal path allocation, transmits the source signal, which comes from the base station, toward the direction of signal path allocation.

According to the objective of the present invention, the present invention also provides a behavior control signal generation method of a deployment agent. The deployment agent performs steps: the deployment agent receives signal quality data, including a plurality of pieces of signal quality information; the deployment agent determines whether the quantity of the pieces of signal quality information has reached a preset value; if the quantity of the pieces of signal quality information has reached the preset value, the deployment agent uses the signal averages, which are calculated from the plurality of pieces of signal quality information, as the reward values of a plurality of the sub-agents of the multi-agent reinforcement learning algorithm; the deployment agent makes the plurality of sub-agents of the multi-agent reinforcement learning algorithm use the reward values to generate and send out behavior control signals; according to the behavior control signal, the automatic signal deployer transmits the source signal, which comes from the base station, toward the direction of the signal path allocation; the deployment agent receives new signal quality data; after the new signal quality data have achieved the requirement of deployment, the deployment agent stops sending out behavior control signals.

In one embodiment, before the new signal quality data reach the requirement of deployment, the deployment agent resumes to undertake the steps beginning from the step of receiving signal quality data until the new signal quality data have achieved the requirement of deployment.

In one embodiment, before the deployment agent resumes to undertake the steps beginning from the step of receiving signal quality data, the deployment agent determines whether the count of the iterations of the reinforcement learning algorithm has reached the upper limit. The deployment agent resumes to undertake the steps beginning from the step of receiving signal quality data before the upper limit of the iteration of the reinforcement learning algorithm is reached. Once the upper limit of the iteration of the reinforcement learning algorithm is reached, the deployment agent will stop sending out the behavior control signal.

In one embodiment, the behavior control signals include one of carrier behavior signals, behavior adjusting signals and mode adjusting signals, or combinations thereof. The carrier behavior signals include a move-forward instruction, a move-backward instruction, a move-leftward instruction, a move-rightward instruction, and a stop-moving instruction for the self-propelled carrier of the automatic signal deployer. The mode adjusting signals include one of a reflect-mode signal, a refract-mode signal and a relay transmission-mode signal or a combination thereof for the signal path redistributor on the self-propelled carrier of the automatic signal deployer. The behavior adjusting signals include azimuth angle adjusting information, elevation angle adjusting information, and height adjusting information. The azimuth angle adjusting information is used to increase or decrease of the azimuth angle of the signal path redistributor. The elevation angle adjusting information is used to increase or decrease of the elevation angle of the signal path redistributor. The height adjusting information is used to increase or decrease of the height of the signal path redistributor.

In summary, the present invention discloses a low-cost signal deployment technology for a communication system, which is characterized in using an automatic signal deployer to re-deploy signal coverage and optimize the efficiency of signal usage; reducing manpower; using an algorithm to perform fast and precise signal deployment in different environments; having a plug-and-play function; neither requiring expensive computing resources nor using deep-learning training models.

DETAILED DESCRIPTION OF THE INVENTION

Figure 1:
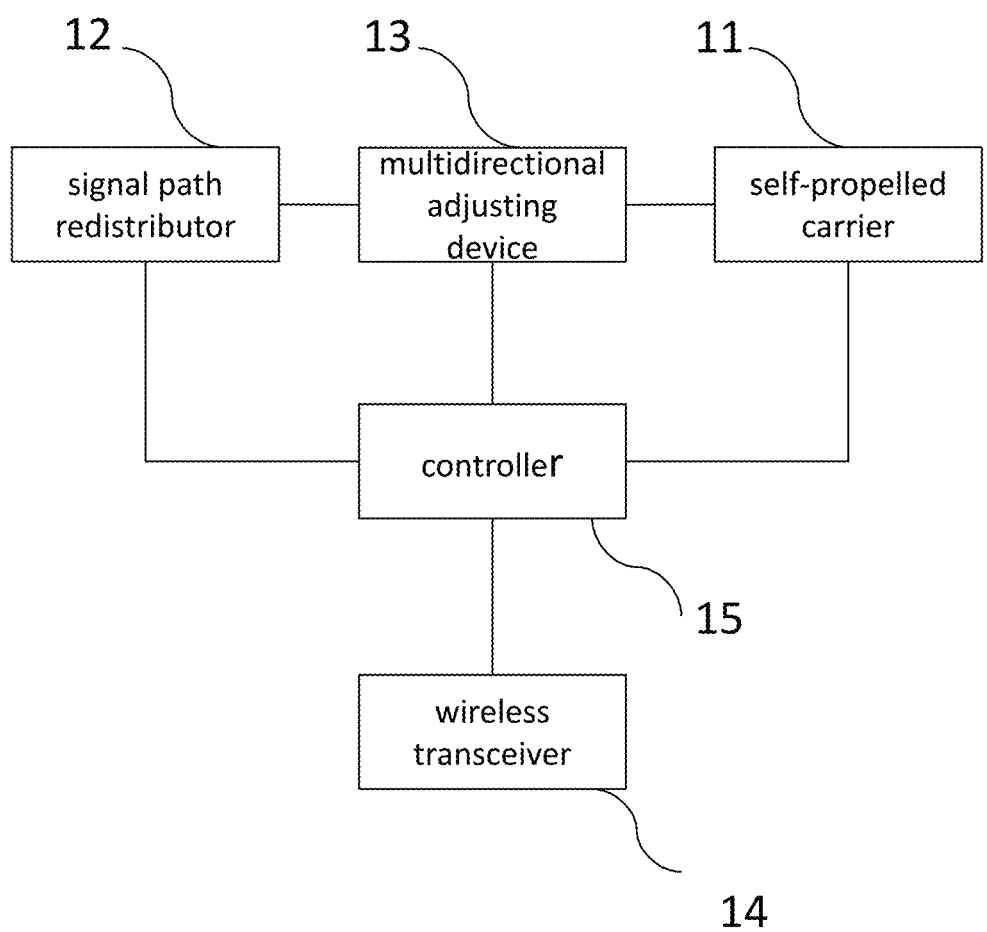
FIG. 1 schematically shows an architecture of an automatic signal deployer according to one embodiment of the present invention.

The embodiments of the present invention will be further demonstrated in details hereinafter in cooperation with the corresponding drawings. In the drawings and the specification, the same numerals represent the same or the like elements as much as possible. For simplicity and convenient labelling, the shapes and thicknesses of the elements may be exaggerated in the drawings. It is easily understood: the elements belonging to the conventional technologies and well known by the persons skilled in the art may be not particularly depicted in the drawings or described in the specification. Various modifications and variations made by the persons skilled in the art according to the contents of the present invention are to be included by the scope of the present invention.

Figure 2:
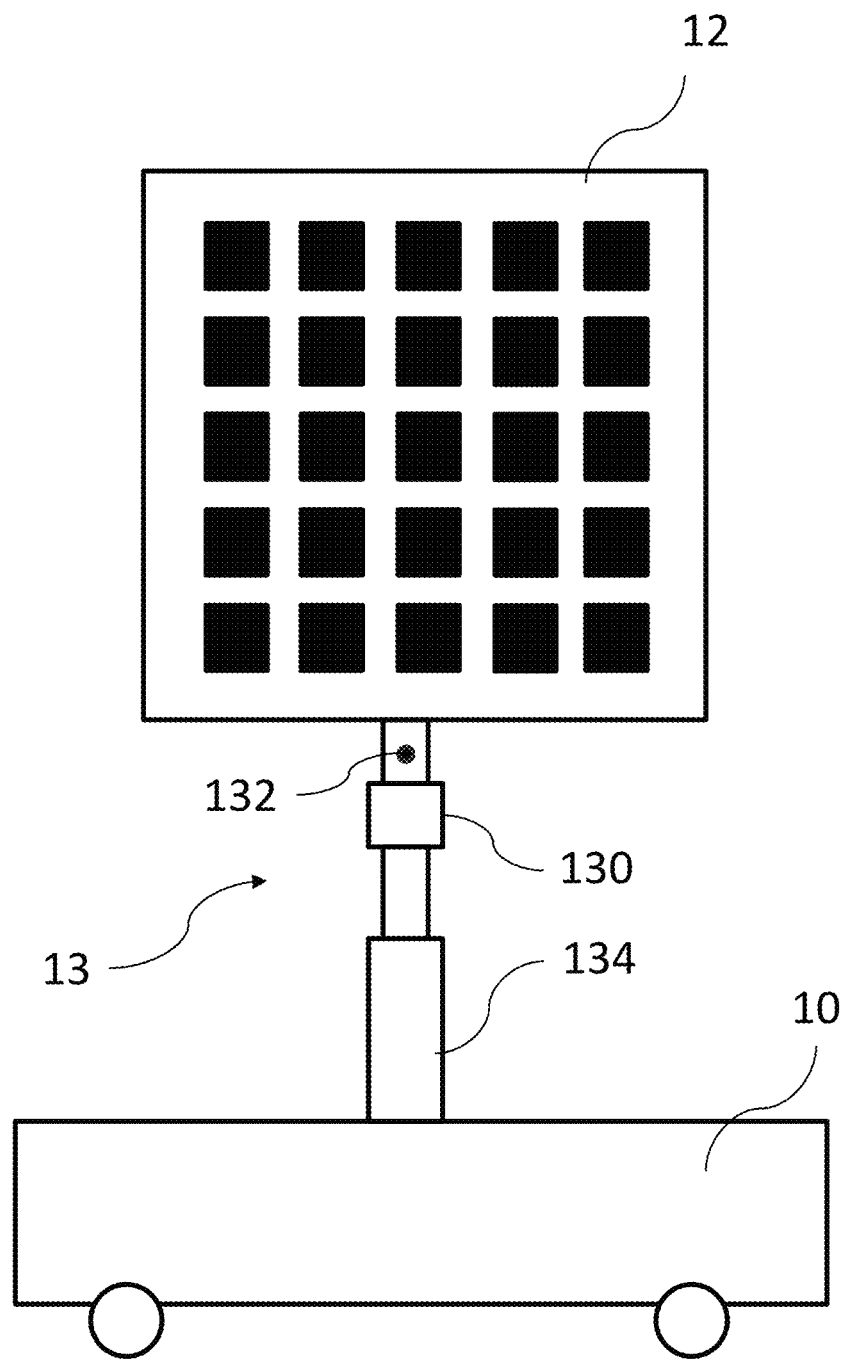
FIG. 2 schematically shows an automatic signal deployer according to one embodiment of the present invention.

Refer to FIG. 1 and FIG. 2. The present invention provides an automatic signal deployer 1, which comprises a self-propelled carrier 11, a signal path redistributor 12, a multidirectional adjusting device 13, a wireless transceiver 14, and a controller 15. The self-propelled carrier 11 may be an unmanned vehicle. The unmanned vehicle may be a robot using a LIDAR sensor, a RADAR sensor, or an infrared sensor. The self-propelled carrier 11 may draw the space layout and the space boundary, which function as the boundary of the measured area. The multidirectional adjusting device 13 is connected with the self-propelled carrier 11 and the signal path redistributor 12. The controller 15 is connected with the self-propelled carrier 11, the signal path redistributor 12, the multidirectional adjusting device 13, and the wireless transceiver 14. The controller 15 may be an embedded system, such as the Raspberry Pi® system, the NVIDIA® Jetson system, the ARM® Cortex-M microcontroller of STMicroelectronics®, or the Arduino® system. The wireless transceiver 14 receives a behavior control signal and transmits the behavior control signal to the controller 15. The wireless transceiver 14 may be a Wi-Fi wireless communication module or a Bluetooth communication module. The controller 15 receives the behavior control signal and analyzes the behavior control signal to generate one of a carrier behavior signal, a behavior adjusting signal, and a mode adjusting signal, or a combination thereof. The controller 15 transmits the carrier behavior signal to the self-propelled carrier 11. The self-propelled carrier 11 moves inside the abovementioned space according to the carrier behavior signal. The controller 15 transmits the mode adjusting signal to the signal path redistributor 12. The signal path redistributor 12 may be a signal path re-distributor made of a reflecting plate, a Reconfigurable Intelligent Surface (RIS), or a meta-material. The signal path redistributor 12 switches to one of a reflection mode, a refraction mode and a relay transmission mode or simultaneously switches to more than two of them according to the mode adjusting signal. The controller 15 transmits the behavior adjusting signal to the multidirectional adjusting device 13. According to the behavior adjusting signal, the multidirectional adjusting device 13 adjusts the signal path allocation direction of the signal path redistributor 12 to enable the signal path redistributor 12 to send a source signal, which comes from a base station 3, toward the signal path allocation direction.

Refer to FIG. 2. In some embodiments, the multidirectional adjusting device 13 includes an azimuth angle adjuster 130, an elevation angle adjuster 132, and a height lifter 134. The height lifter 134 may be a vertical lifting device using linear slide rails, pneumatic cylinders, or hydraulic cylinders. The combination of the azimuth angle adjuster 130 and the elevation angle adjuster 132 may be in form of a dual-axis robot arm. Alternatively, the combination of the azimuth angle adjuster 130, the elevation angle adjuster 132, and the height lifter 134 may be in form of a tri-axis robot arm. However, the present invention is not limited by the abovementioned embodiments. As long as a device can drive the signal path redistributor 12 to move in three axes, the device would belong to the multidirectional adjusting device 13 of the present invention. The behavior adjusting signals include azimuth angle adjusting information, elevation angle adjusting information, and height adjusting information. The height lifter 134 is connected with the self-propelled carrier 11 and the azimuth angle adjuster 130. The elevation angle adjuster 132 is connected with the azimuth angle adjuster 130. The azimuth angle adjuster 130 is connected with the signal path redistributor 12. The height lifter 134 receives the height adjusting information and adjusts the height of the signal path redistributor 12 according to the height adjusting information. The azimuth angle adjuster 130 receives the azimuth angle adjusting information and adjusts the azimuth angle of the signal path redistributor 12 according to the azimuth angle adjusting information. The elevation angle adjuster 132 receives the elevation angle adjusting angle and adjusts the elevation angle of the signal path redistributor 12 according to the elevation angle adjusting information.

Figure 3:
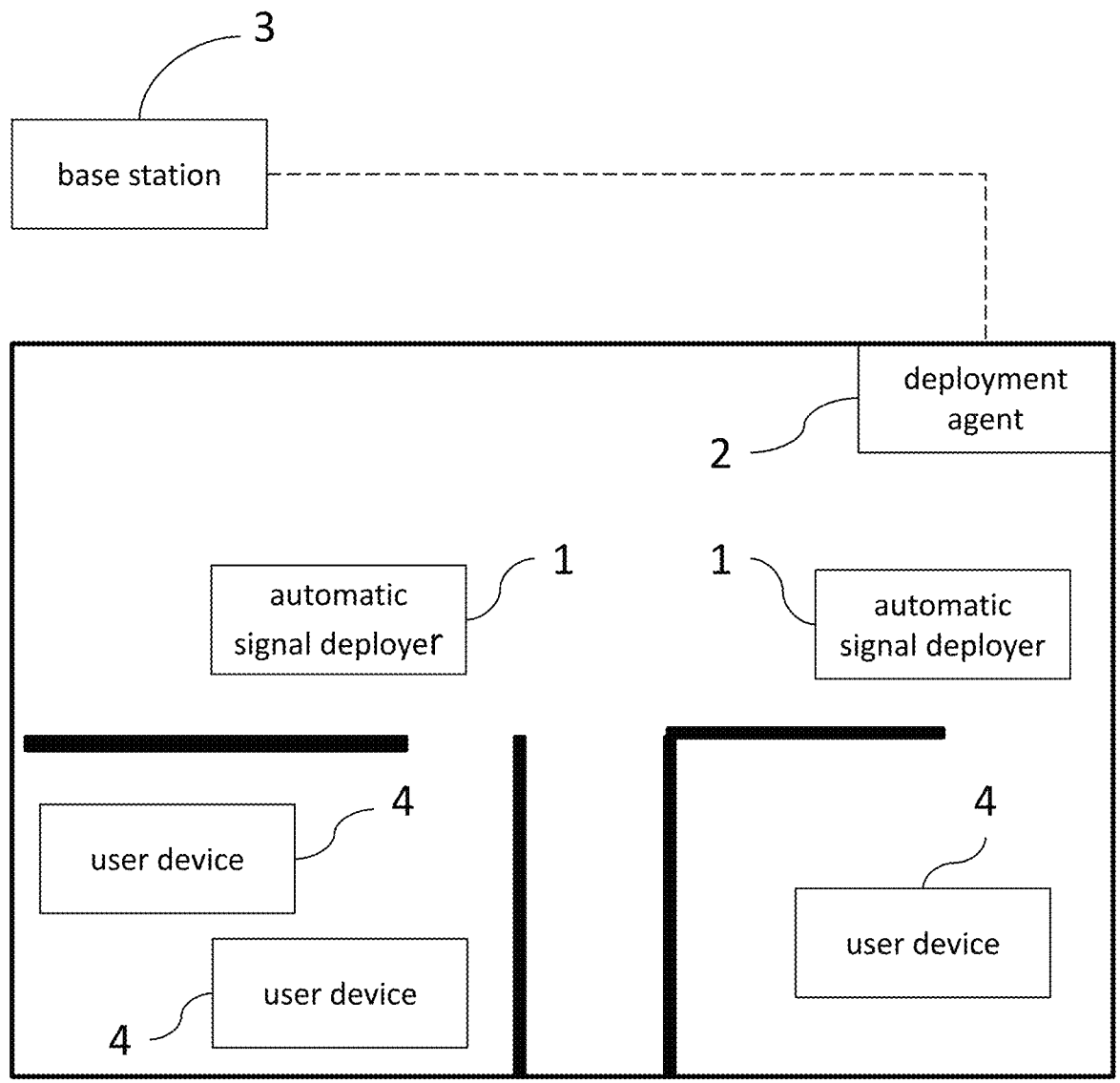
FIG. 3 schematically shows an application environment according to one embodiment of the present invention.

Refer to FIG. 3. The present invention also provides an automatic signal deployment system, which comprises an automatic signal deployer 1, a deployment agent 2, and a base station 3. The deployment agent 2 may be an edge computing device, such as a Dell EMC PowerEdge® server, a Hewlett Packard Enterprise Edgeline® server, or a notebook computer. The deployment agent 2 receives signal quality data, generates a behavior control signal according to the signal quality data, and sends out the behavior control signal to the automatic signal deployer 1. The automatic signal deployer 1 receives the behavior control signal. According to the behavior control signal, the automatic signal deployer 1 moves to an assigned position, adjusts the automatic signal deployer 1 to perform one of a reflection mode, a refraction mode and a relay transmission mode, or simultaneously perform more than two of them, and adjusts the direction of signal path allocation, whereby the automatic signal deployer 1 can transmit the source signal, which comes from the base station 3, toward the direction of signal path allocation.

FIG. 3 is a diagram schematically showing an application environment, wherein a base station 3 is disposed outdoors. The base station 3 sends out millimeter-wave signals. Because the millimeter-wave signals has low transmittance, different automatic signal deployersl are used to provide one or more than two of reflection, refraction and relay transmission of the millimeter-wave signals for two rooms in the space. The Wi-Fi communication, which has fine transmittance, is used to transmit signal quality data among user devices 4, the automatic signal deployers 1 and the deployment agent 2. The automatic signal deplorers 1 are able to move inside the indoor space.

In some embodiments, the deployment agent 2 may receive the signal quality data from the user devices 4. Alternatively, the signal quality data are received by the base station 3. The base station 3 may be a fixed base station, a small base station or an indoor base station, especially one of 5G millimeter-wave base stations.

In some embodiments, the signal quality data includes a plurality of pieces of signal quality information, such as one of Received-Signal Strength Indicator (RSSI), Signal-to-Noise Ratio (SNR), Signal to Interference plus Noise Ratio (SINR), Reference Signal Received Power (RSRP), Reference Signal Received Quality (RSRQ), Bit Error Rate (BER), Packet Error Rate (PER), and Packet Drop Rate (PDR).

In one embodiment, the deployment agent 2 is equipped with a multi-agent reinforcement learning algorithm. The deployment agent 2 uses the signal averages, which are calculated from a plurality of pieces of signal quality information, as the reward values of a plurality of the sub-agents of the multi-agent reinforcement learning algorithm. The deployment agent 2 uses the plurality of sub-agents to generate behavior control signals. After the automatic signal deployer 1 transmits the source signal, which comes from the base station 3, toward the direction of the signal path allocation, the deployment agent 2 receives new signal quality data. After the new signal quality data have achieved the requirement of deployment, the deployment agent 2 stops sending out behavior control signals. In some embodiments, another deep-learning or machine-learning technology may replace the multi-agent reinforcement learning algorithm to generate behavior control signals.

In one embodiment, before the new signal quality data reach the requirement of deployment, the deployment agent 2 receives signal quality data again and sends out new behavior control signals until the new signal quality data achieve the requirement of deployment. Herein, it should be explained particularly: the action that the deployment agent 2 receives signal quality data again may be that the deployment agent 2 receives new signal quality data or that the deployment agent 2 abandons new signal quality data and receives another signal quality data.

Figure 4:
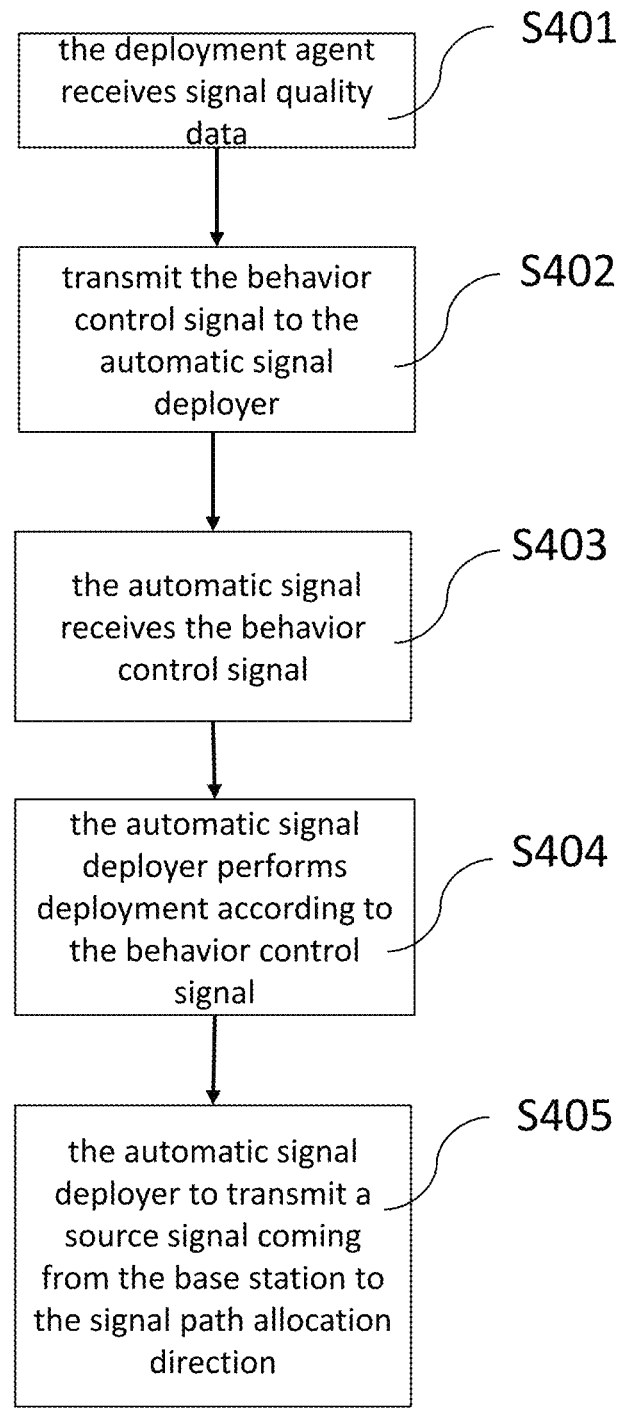
FIG. 4 shows a flowchart of a signal path deployment method according to one embodiment of the present invention.

Refer to FIG. 4. The present invention also provides an automatic signal path deployment method, which is applied to a signal deployment system. The signal deployment system comprises the automatic signal deployer 1, the deployment agent 2, and the base station 3. The automatic signal path deployment method comprises steps:
  (S401) the deployment agent 2 receives signal quality data, including a plurality of pieces of signal quality information, generates a behavior control signal according to the plurality of pieces of signal quality information;
  (S402) the deployment agent 2 transmits the behavior control signal to the automatic signal deployer 1;
  (S403) the automatic signal deployer 1 receives the behavior control signal;
  (S404) the automatic signal deployer 1 performs deployment behaviors according to the behavior control signal, including moving to an assigned position, and adjusts the direction of signal path allocation of the automatic signal deployer 1;
  (S405) the automatic signal deployer 1 transmits a source signal, which comes from the base station 3, toward the direction of signal path allocation.

Figure 5:
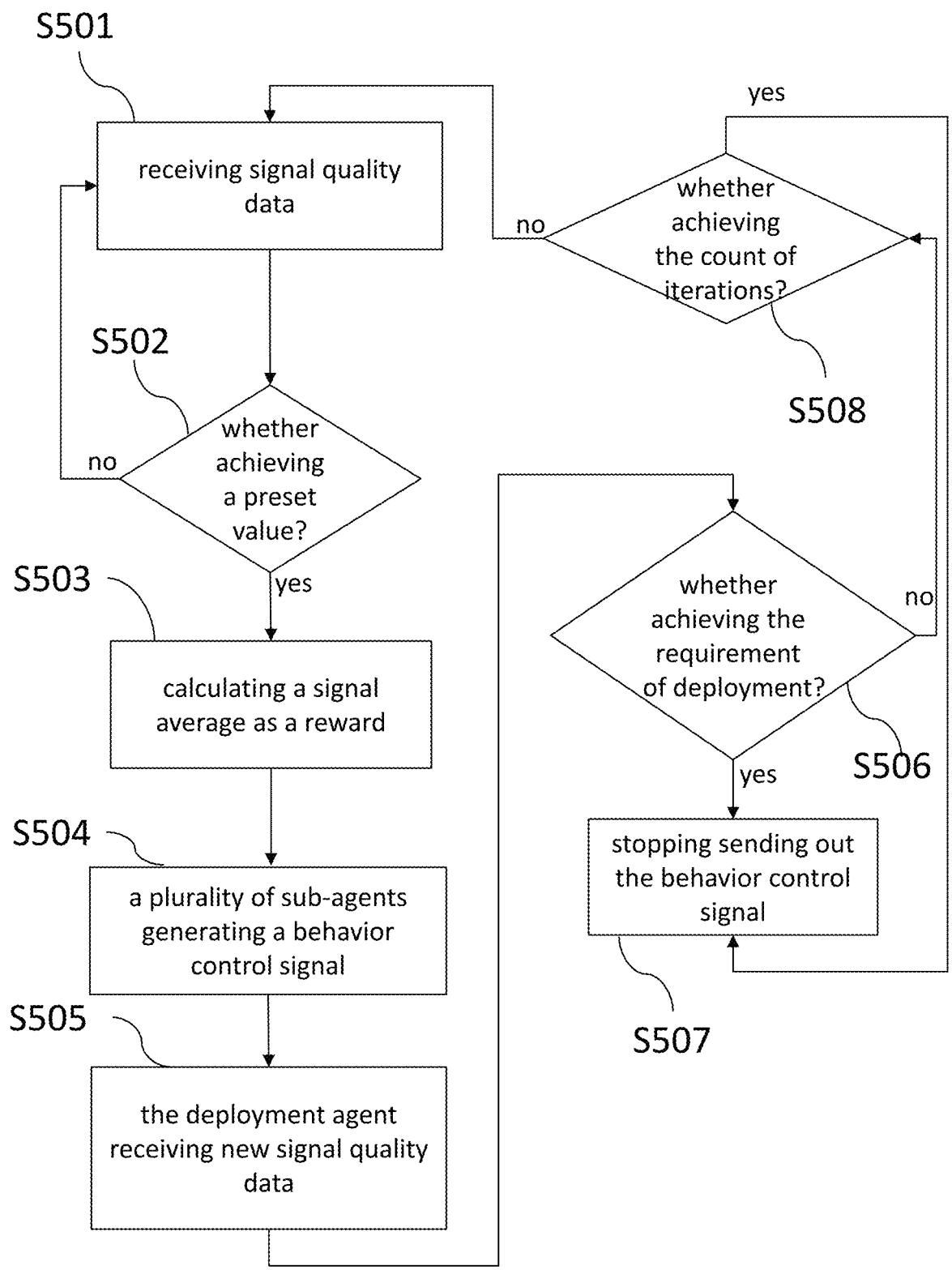
FIG. 5 shows a flowchart of a behavior control signal generation method of a deployment agent according to one embodiment of the present invention.

Refer to FIG. 5. The present invention also provides a behavior control signal generation method of a deployment agent 2. The deployment agent 2 performs following steps:
  (S501) receiving signal quality data, which includes a plurality of pieces of signal quality information;
  (S502) determining whether the quantity of signal quality data have reached a preset value; if yes, the process proceeds to Step S503; if no, the process proceeds to Step S501;
  (S503) using signal averages, which are calculated from the plurality of pieces of signal quality information, as reward values of a plurality of sub-agents of a multi-agent reinforcement learning algorithm, while the quantity of signal quality data have reached the preset value;
  (S504) making the plurality of sub-agents of the multi-agent reinforcement learning algorithm use the reward values to generate and send out behavior control signals;
  (S505) receiving new signal quality data after the automatic signal deployer 1 transmits the source signal, which comes from the base station 3, toward the direction of the signal path allocation according to the behavior control signal;
  (S506) determining whether the new signal quality data have achieved the requirement of deployment; if yes, the process proceeds to Step S507; if no, the process proceeds to Step S501;
  (S507) stops sending out behavior control signals.

In some embodiments, before the deployment agent 2 resumes to undertake the steps beginning from the step of receiving signal quality data, the deployment agent 2 determines whether the count of the iterations of the reinforcement learning algorithm has reached the upper limit. While the count of the iterations of the reinforcement learning algorithm has not reached the upper limit yet, the process proceeds to Step S501. Once the count of the iterations of the reinforcement learning algorithm has reached the upper limit, the process proceeds to Step S507.

In some embodiments, the behavior control signals include one of carrier behavior signals, behavior adjusting signals and mode adjusting signals, or a combination thereof. The carrier behavior signals include a move-forward instruction, a move-backward instruction, a move-leftward instruction, a move-rightward instruction, and a stop-moving instruction for the self-propelled carrier 11. The mode adjusting signals include one of a reflect-mode signal, a refract-mode signal and a relay transmission-mode signal, or a combination thereof for the signal path redistributor 12. The behavior adjusting signals include azimuth angle adjusting information, elevation angle adjusting information, and height adjusting information. The azimuth angle adjusting information is used to increase or decrease of the azimuth angle of the signal path redistributor 12. The elevation angle adjusting information is used to increase or decrease of the elevation angle of the signal path redistributor 12. The height adjusting information is used to increase or decrease of the height of the signal path redistributor 12.

Below, examples are used to further demonstrate how the multi-agent reinforcement learning algorithm generates the behavior control signals.

In an example, N automatic signal deployers 1 (unmanned vehicles) provide service for K user devices 4 in a space X. It should be noted: each automatic signal deployer 1 is equipped with a signal path redistributor 12. Each signal path redistributor 12 has M elements. N, K, and M are positive integers. The nth unmanned vehicle is expressed by $X_n^{UV}$. The kth user device is expressed by $X_k^{UE}$. The base station is expressed by $X^{BS}$ "n" is the serial number of an unmanned vehicle in a series of N unmanned vehicles. For example, N=5 indicates that there are totally 5 unmanned vehicles; the 3rd unmanned vehicle is expressed by XIV. "k" is the serial number of a user device in a series of K user devices. For example, K=8 indicates that there are totally 8 user devices; the 6th user device is expressed by $X_6^{UE}$. The positions, heights, directions, elevation angles of the nth unmanned vehicle $X_n^{UV}$, the kth user device $X_k^{UE}$, and the base station $X^{BS}$ are defined as follows:

$$X_n^{UV}(x_n^{UV}, y_n^{UV}, h_n^{UV}, \vartheta_n^{UV}, \varphi_n^{UV}) \quad \text{Equation (1)}$$

$$X_k^{UE}(x_k^{UE}, y_k^{UE}, h_k^{UE}, \vartheta_k^{UE}, \varphi_k^{UE}) \quad \text{Equation (2)}$$

$$X^{BS}(x^{BS}, y^{BS}, h^{BS}, \vartheta^{BS}, \varphi^{BS}) \quad \text{Equation (3)}$$

wherein $\vartheta$ is the azimuth angle, $\varphi$ the elevation angle, x the first axis, y the second axis, h the height; x and y are jointly used to express the position.

The deployment of the nth automatic signal deployer 1 is defined as $\Theta_n^X$:

$$\Theta_n^{ref} = \begin{bmatrix} \beta_{n,1}^{ref} e^{j\phi_{n,1}^{ref}} & 0 & \cdots & 0 \\ 0 & \beta_{n,2}^{ref} e^{j\phi_{n,2}^{ref}} & & \vdots \\ \vdots & & \ddots & 0 \\ 0 & \cdots & 0 & \beta_{n,m}^{ref} e^{j\phi_{n,m}^{ref}} \end{bmatrix} \quad \text{Equation (4)}$$

wherein Equation (4) expresses the reflection or refraction function. In other words, ref ∈ {Refl, Refr}, wherein denotes reflection, Refr refraction, β the amplitude, $\phi$ the phase angle. The total number of the transmission elements to the automatic signal deployer 1 amounts to M, and "m" is the serial number of a transmission element in a series of M transmission elements. For example, M=9 indicates that there are totally 9 transmission elements; m=3 indicates the $3^{rd}$ transmission element. The amplitude constraint is expressed by $0 \leq \beta_{n,m}^x \leq 1$. The relationship between reflection and refraction of the transmission element is expressed by $$\beta_{n,m}^{Refl} + \beta_{n,m}^{Refr} = 1 \quad \text{Equation (5)}$$

The phase angle constraint is expressed by $0 \leq \phi_{n,m}^{ref} \leq 2\pi$. The wireless communication channel between the base station 3 and the nth automatic signal deployer 1 is expressed by $H_n$. The channel between the nth automatic signal deployer 1 and the kth user device 4 is expressed by $G_{n,k}$. It is learned: the channel parameters of transmission and reception are highly geometrically correlated. Therefore, $H_n$ and $G_{n,k}$ may be expressed as mapping functions:

$$H_n = f(X_n^{UV}, X^{BS}) \quad \text{Equation (6)}$$

$$G_{n,k} = f(X_n^{UV}, X_k^{UE}) \quad \text{Equation (7)}$$

Because of environmental complexity, it is hard to obtain the complicated mapping of f $(X_n^{UV}, X^{BS})$ and f $(X_n^{UV}, X_k^{UE})$. For example, signal attenuation may occur in different extents for different distances and different directions in different environments.

The signal $Y_k$ received by the kth user device 4 may be expressed by $$Y_k = \sum_{n=1}^{N} L_{n,k}^{x'} G_{n,k} \Theta_n^{x'} H_n \left( X_k + \sum_{i \neq k}^{K} X_i \right) + N_k \quad \text{Equation (8)}$$

wherein $N_k$ is the noise to the kth user device 4; $L_{n,k}^{x'}$ indicates that the kth user device 4 is located in a deployment area x' of the nth automatic signal deployer 1 in the space X; $X_k$ is the expected signal emitted from the base station 3 to the kth user device 4; $X_i$ is the interference signal between the kth user device 4 and the base station 3, wherein i is the index of the interference to the user signal; i≠k; the remaining K−1 users are the sources of interference signals. Therefore, the power $P_{r,k}$ of the reference signal, which is received by the kth user device 4, may be expressed by $$P_{r,k} = \left| \sum_{n=1}^{N} L_{n,k}^{x'} G_{n,k} \Theta_n^{x'} H_n X_k \right|^2 \quad \text{Equation (9)}$$

wherein P expresses power; r expresses reference.

The indicator of the intensity received by the kth user device 4 may be obtained from the mapping relationship and expressed by Equation (10):

$$RSSI_k = f_{RSSI}(P_{r,k}) \quad \text{Equation (10)}$$

The Signal to Interference plus Noise Ratio (SINR) of the kth user device 4 may be obtained from Equation (11):

$$\gamma_k = \frac{\left| \sum_{n=1}^{N} L_{n,k}^{x'} G_{n,k} \Theta_n^{x'} H_n X_k \right|^2}{I_k + \sigma^2} \quad \text{Equation (11)}$$

wherein $I_k = |\sum_{n=1}^{N} L_{n,k}^{x'} G_{n,k} \Theta_n^{x'} H_n \sum_{i \neq k}^{K} X_i|^2$ is the interference; $\sigma^2$ is the interference power.

The Shannon capacity $R_k$ may be obtained from Equation (12):

$$R_k = \log_2(1 + \gamma_k) \quad \text{Equation (12)}$$

The overall system speed of the kth user device 4 may be calculated from Equation (12) and expressed by $$R_{sys} = \sum_{k=1}^{K} R_k \quad \text{Equation (13)}$$

The bit error rate of the kth user device 4 may be worked out with the Interference plus Noise Ratio (SINR) according to Equation (14):

$$BER_k = f_{BER}(\gamma_k) = \frac{\text{Number of error bits}}{\text{Total transmitted bits}} \quad \text{Equation (14)}$$

The Packet Error Rate (PER) may be worked out with the bit error rate according to Equation (15):

$$PER_k = f_{PER}(BER_k) = \frac{\text{Number of erroneous packets}}{\text{Total transmitted packets}} \quad \text{Equation (15)}$$

The Packet Drop Rate (PDR) may be worked out according to Equation (16):

$$PDR_k = \frac{\text{Number of dropped packets}}{\text{Total transmitted packets}} \quad \text{Equation (16)}$$

It should be noted: $f_{RSSI}(P_{r,k})$, $f_{BER}(\gamma_K)$ and $f_{PER}(BER_K)$ are normally hard to acquire mathematical closed forms in a complicated communication system.

In such a problem, it is desired to optimize the overall system utility function:

$$U = \lambda_1 R_{sys} + \sum_{k=1}^{K} (\lambda_2 RSSI_k + \lambda_3 BER_k + \lambda_4 PER_k + \lambda_5 PDR_k) \quad \text{Equation (17)}$$

wherein $\lambda_i$ is the weight of each performance index, and $i \in \{1, 2, 3, 4, 5\}$. It is observed: other performance indexes, such as RSRP, RSRQ, SNR, delay, tremble, and pack drop rate, may also be incorporated into Equation (17). The abovementioned performance indexes are only for exemplification. The present invention is not limited to use the abovementioned performance indexes. As the system varies with time, the optimized solution is unlikely to acquire instantly. Therefore, a Multi-Agent Reinforcement Learning (MARL) algorithm is designed for the deployment of the automatic signal deployer 1. The critical concept of MARL is that each sub-agent updates its strategy according to the observed status and the reward function. Firstly, the deployment action $A_n$ is defined as $$A_n = \{\delta x_n^{UV}, \delta y_n^{UV}, \delta h_n^{UV}, \delta \vartheta_n^{UV}, \delta \varphi_n^{UV}, \delta \beta_{n,m}^{ref}, \delta \phi_{n,m}^{ref}\},$$

$$\forall n \in \{1, \ldots, N\}, m \in \{1, \ldots M\}, x \in \{\text{Refl}, \text{Refr}\} \quad \text{Equation (18)}$$

wherein $\delta x_n^{UV}$, $\delta y_n^{UV}$, $\delta h_n^{UV}$ are the unit step lengths of the positional movement of the automatic signal deployer 1; $\delta \vartheta_n^{UV}$, $\delta \varphi_n^{UV}$ are the step lengths of the azimuth angle and the elevation angle of the unmanned ref vehicle; $\delta \beta_{n,m}^{ref}$, $\delta \phi_{n,m}^{ref}$ is the step lengths of the amplitude of the signal path redistributor and the phase angle. The status $S_n$ of each automatic signal deployer 1 is the current geometrical information and expressed by $$S_n = \{x_n^{UV}, y_n^{UV}, h_n^{UV}, \vartheta_n^{UV}, \varphi_n^{UV}, \beta_{n,m}^{ref}, \phi_{n,m}^{ref}\}, \quad \text{Equation (19)}$$

$$\forall n \in \{1, \ldots, N\}, m \in \{1, \ldots M\}, ref \in \{Refl, Refr\}$$

As $A_n$ and $S_n$ need larger storage space, they are divided into the combinations of the sub-agents of the parameters:

$$A_{n,z} = \{\delta z_n^{UV}\}, \forall z \in \{x, y, h, \vartheta, \varphi, \beta, \phi\}, n \in \{1, \ldots, N\} \quad \text{Equation (20)}$$

$$S_{n,z} = \{z_n^{UV}\}, \forall z \in \{x, y, h, \vartheta, \varphi, \beta, \phi\}, n \in \{1, \ldots, N\} \quad \text{Equation (21)}$$

Below are listed the calculation actions of the sub-agents of the multi-agent reinforcement learning algorithm of the automatic signal deployer 1.
Position:
 Move-forward ($\delta x_n^{UV}=0, \delta y_n^{UV} \geq 0$);
 Move-backward ($\delta x_n^{UV}=0, \delta y_n^{UV} \leq 0$);
 Move-leftward ($\delta x_n^{UV} \leq 0, \delta y_n^{UV}=0$);
 Move-rightward ($\delta x_n^{UV} \geq 0, \delta y_n^{UV}=0$);
 Stop-moving ($\delta x_n^{UV}=0, \delta y_n^{UV}=0$).
Height:
 Rise ($\delta h_n^{UV} \geq 0$);
 Descend ($\delta h_n^{UV} \leq 0$).
Azimuth Angle:
 Increase azimuth angle ($\delta \vartheta_n^{UV} \geq 0$);
 Decrease azimuth angle ($\delta \vartheta_n^{UV} \leq 0$).
Elevation Angle:
 Increase elevation angle ($\delta \varphi_n^{UV} \geq 0$);
 Decrease elevation angle ($\delta \varphi_n^{UV} \leq 0$).
Transmission Mode:
 Reflection ($\delta \beta_{n,m}^{Refl} \neq 0$, $\delta \beta_{n,m}^{Refr}=0$);
 Refraction ($\delta \beta_{n,m}^{Refl}=0$, $\delta \beta_{n,m}^{Refr} \neq 0$);
 Dual-mode ($\beta_{n,m}^{refl} \neq 0$, $\delta \beta_{n,m}^{Refr} \neq 0$, $\beta_{n,m}^{Refl} + \beta_{n,m}^{Refr}=1$).
The amplitude or phase angle may be increased or decreased to satisfy $0 \leq \beta_{H,m}^{x} \leq 1$ and $0 \leq \phi_{n,m}^{x} \leq 2\pi$.
The time is denoted by t. At the time point of t+1, the state $z_{n,t+1}^{UV}$ of the sub-agent of each parameter may be updated as follows.

$$z_{n,t+1}^{UV} \leftarrow z_{n,t}^{UV} + \delta z_{n,t}^{UV} \quad \text{Equation (22)}$$

Equation (21) is a general formula. After time t is introduced into Equation (21), Equation (21) becomes $z_{n,t}^{UV}$, wherein $z_{n,t}^{UV}$ represents the status of the sub-agent of each parameter at different times. Equation (20) is a general formula. After time t is introduced into Equation (20), Equation (20) becomes $\delta z_{n,t}^{UV}$, wherein $\delta z_{n,t}^{UV}$ represents the varying step length of the status of the sub-agent of each parameter at different times.

The time scale of deployment (using second as its unit) is much larger than that of wireless signals (using millisecond as its unit). Thus, the average of W pieces of historical received data are used as the reward $R_t$, which may be expressed as $$R_t = \frac{1}{W}\sum_{\tau=1}^{W} U_{t-\tau} \quad \text{Equation (23)}$$

wherein Equation (17) is the general formula of the overall system utility function; $U_{t-\tau}$ expresses historical received data and also represents the overall system utility function at the time point of t−τ; τ is the time difference between the corresponding time point and the time point of t; W expresses the quantity of historical received data.

In order to prevent from being trapped by a local optimal solution, a greedy algorithm is used to balance the mobile exploration and its utilization of each automatic signal explorer and expressed by $$A_{n,z,t} = \begin{cases} \text{Random Action from total set } A_{n,z}, \text{ if } \epsilon \leq \epsilon_{th}, \\ \max_{A'} Q(S_{n,z,t}, A'), \text{ Otherwise.} \end{cases} \quad \text{Equation (24)}$$

wherein $\epsilon$ is a random number, which is pseudo-randomly generated and ranges between 0 and 1; $\epsilon_{th}$ is the exploration rate. After executing the action $A_{n,z,t}$ and acquiring the reward $R_t$, the automatic signal deployer 1 will update the Q table of each sub-agent. The Q table is denoted by $Q(S_{n,z,t}, A_{n,z,t})$, and the equation thereof is expressed by $$Q(S_{n,z,t}, A_{n,z,t}) \leftarrow Q(S_{n,z,t}, A_{n,z,t}) + \frac{\varepsilon_1}{N(A_{n,z,t})} \cdot \quad \text{Equation (25)}$$
$$[R_t + \varepsilon_2 \cdot \max_{A' \in A_{n,z}}(Q(S_{n,z,t+1}, A') - Q(S_{n,z,t}, A_{n,z,t}))]$$

wherein $\varepsilon_1$ is the discount factor; $\varepsilon_2$ is the learning rate; $N(A_{n,z,t})$ is the total number of the execution of the action $A_{n,z,t}$; $R_t$ is the reward obtained from the base station 3.

Figure 6:
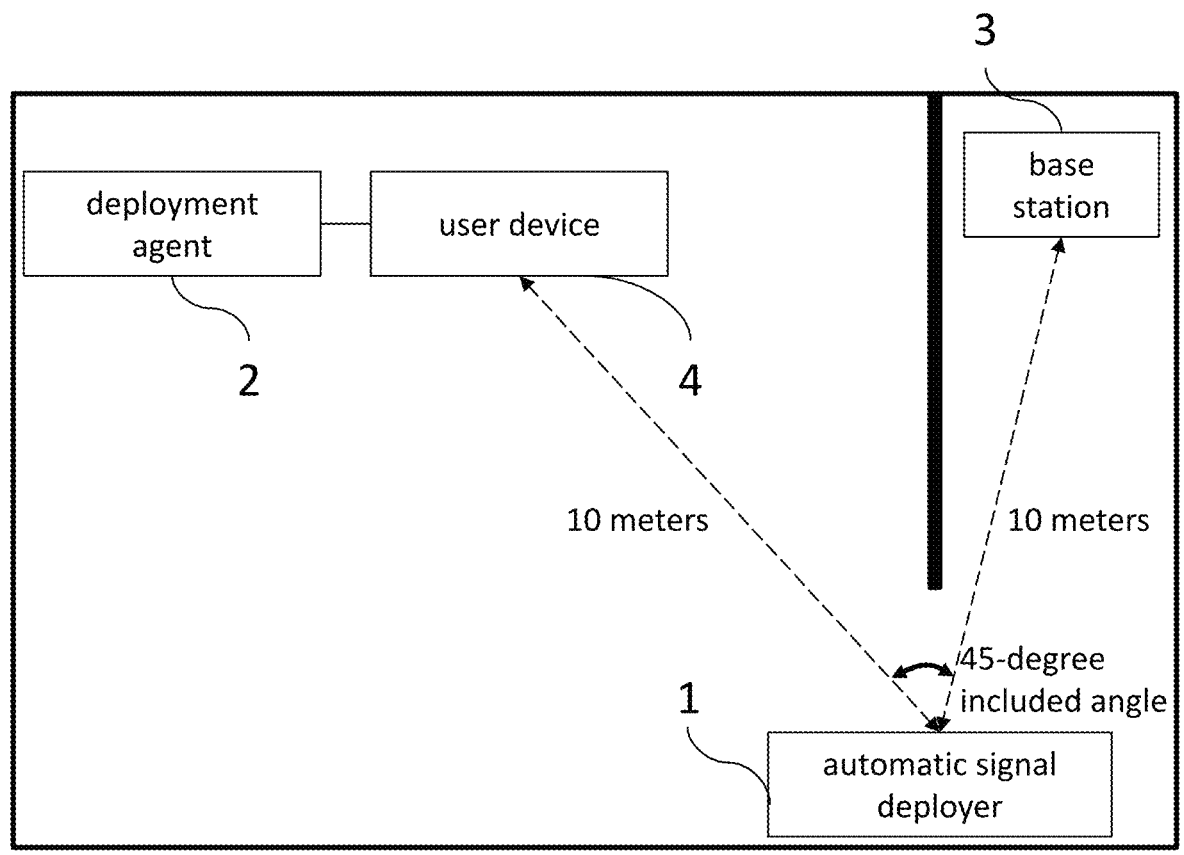
FIG. 6 schematically shows an application environment according to another embodiment of the present invention.

The process that the automatic signal deployer performs deployment in experiment is described below. Refer to FIG. 6. The deployment agent 2 (notebook computer) automatically connects with the automatic signal deployer 1 through Wi-Fi. A receiver functions as the user device 4 and connects with the deployment agent 2 through optical fiber. The base station 3-related packet transmission is monitored with iperf3 (an open tool for monitoring packet transmission), wherein the base station 3 functions as the server, and the receiver functions as the client. The network quality test software (such as iperf3) is initialized to make the base station 3 begin to transmit downlink data to the receiver. If the receiver does not receive the packet, the server-client link will be re-established. If the receiver receives the packet, the notebook computer, which is connected with the receiver, will collect signal quality data persistently. The experiment acquires a plurality of pieces of throughput data as the signal quality information. The signal quality information may be Throughput, RSSI, SINR, RSRP, BER, PER, and PDR.

Next are established the deployment boundaries, which are also called the measured area boundaries and expressed by $z_{min,n}^{UV}$ and $z_{max,n}^{UV}$. The deployment should satisfy the following condition:

$$z_{min,n}^{UV} \leq z_{n,t}^{UV} \leq z_{max,n}^{UV}, \quad \text{Equation (26)}$$

$$\forall z \in \{x, y, h, \vartheta, \varphi, \beta, \phi\}, n \in \{1, \ldots, N\}$$

It should be noted: the robot using Lidar/Radar/Infrared sensor may be used to perform the mission of establishing deployment boundaries, whereby to draw the layout of the space X, which functions as the measured area boundaries. Next are established the size W of the observation window of the sub-agents and the parameters of the reinforcement learning algorithm, including the discount factor $\varepsilon_1$, the learning rate $\varepsilon_2$, the Q table, and the exploration rate $\epsilon_{th}$, wherein the Q table is expressed by $Q(S_{n,z,t}, A_{n,z,t})$. After the data transmission process between the base station 3 and the user device 4 has been initialized, the automatic signal deployer 1 will obtain the overall system utility function $U_t$ at the time point of t (refer to Equation (17)), i.e. the performance of the new signal quality data. For example, the new signal quality data may be the signal throughput between the base station 3 and the user device 4, which amounts to 900 Mbps. If we cannot obtain sufficient signal quality information from the observation window with a given size of W, we will wait until we can obtain sufficient signal quality information. In other words, after t≥W, the multi-agent reinforcement learning algorithm will be executed. W pieces of $U_t$ data are retrieved to calculate the reward $R_t$ of the multi-agent reinforcement learning algorithm. In the present invention, t is not the absolute time (such as five past three). Only a determination is done at a time point, i.e. only an iteration is done at a time point. t≥W indicates that the time spent in iterations is greater than the size of the observation window. While the system is restarted, t is reset to zero (expressed by t=0). For example, suppose that the time takes 3 seconds as a unit; while t=1, it indicates that 3 seconds have elapsed from 1-0; while t=2, it indicates that 6 seconds have elapsed from t=0 and that 3 seconds have elapsed from t=1.

Figure 7:
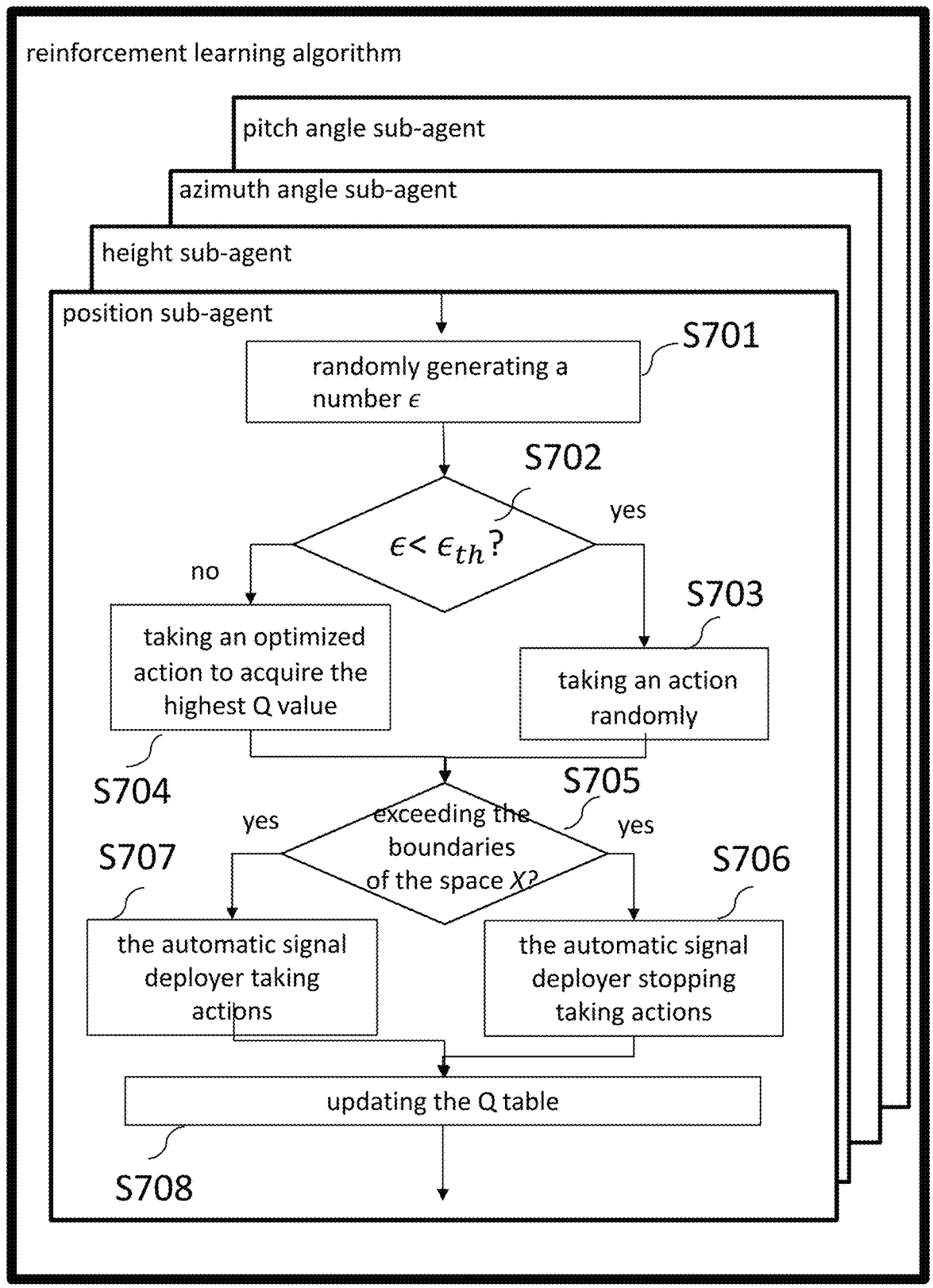
FIG. 7 shows a flowchart of a behavior control signal generation method of a plurality of sub-agents of a deployment agent according to one embodiment of the present invention.

Refer to FIG. 7, which shows a flowchart of a behavior control signal generation method of a deployment agent. According to Equation (24), randomly generate a number e within the range between 0 and 1 to perform the greedy algorithm (S701). Determine whether the number e is smaller than the given threshold $\epsilon_{th}$ (S702). If the number e is smaller than the given threshold Eth, each sub-agent will take an action randomly (S703). If the number $\epsilon$ is not smaller than the given threshold Eth, each sub-agent will take an optimized action to acquire the highest Q value (S704). After each sub-agent have taken the action $A_{n,z,t}$, the reinforcement learning algorithm will examine whether the action results in that the action of the automatic signal deployer 1 exceeds the boundaries of the space X according to Equation (26) (S705). If the action of the automatic signal deployer 1 exceeds the boundaries of the space X, the automatic signal deployer 1 stops taking actions (S706). If the action of the automatic signal deployer 1 does not exceed the boundaries of the space X, the automatic signal deployer 1 takes actions again (S707). The actions performed by all the sub-agents will obtain an average reward $R_t$. According to Equation (22) and the selected action, update the Q table $Q(S_{n,z,t}, A_{n,z,t})$ (S708). In FIG. 7, the position sub-agent is used as the example; the processes and architectures of the height sub-agent, the azimuth angle sub-agent, and the elevation angle sub-agent are the same as the position sub-agent. The multi-agent reinforcement learning algorithm will be undertaken persistently until the automatic signal deployer 1 finds a suitable deployment having acceptable performance, which is expressed by $$U_t \geq U_{th} \qquad \text{Equation (27)}$$

wherein $U_{th}$ is the lowest requirement of deployment. The total process will end while the deployment requirement is satisfied or the maximum number of iterations is exceeded.

In the experiment, the present invention is tested in conditions: non-line of sight, multiple reflections, barrier of human bodies, handheld behaviors, distance, and operating bandwidth range. In the non-line of sight, the throughput of the base station 3 may reach as high as 1 Gbps with a bandwidth of 100 MHz and a BS transmit power of 21 dBm. In comparison with the case free of the automatic signal deployer 1, the present invention may raise the speed by as high as 400 Mbps (2-3 times). The signal automatic deployer 1 needn't use optical fiber, reducing the deployment cost, realizing automatic deployment, and consuming less manpower. The signal automatic deployer 1 can learn from historical data and thus decrease the cost of re-measurement and off-line learning. The signal deployment system of the present invention spends shorter time in deployment (about 10 minutes for an area of 10×8 square meters). In comparison with the conventional technology, the present invention can reduce the deployment time by more than 1 hour.

Figure 8:
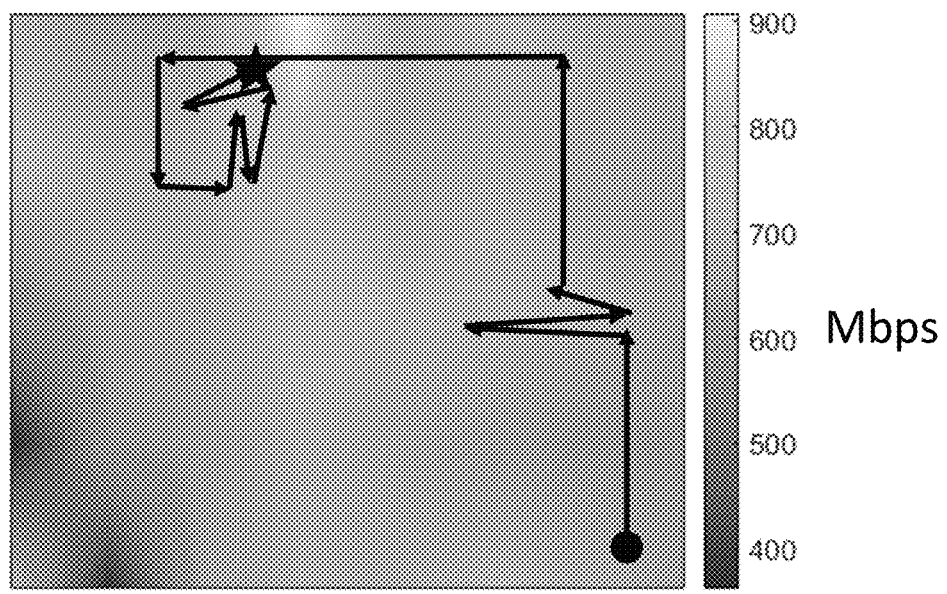
FIG. 8 schematically shows that an automatic signal deployer moves from a start point, which is at the right lower position in an indoor space and designated by a dot, and reaches an assigned position, which is designated by a star.
Figure 9:
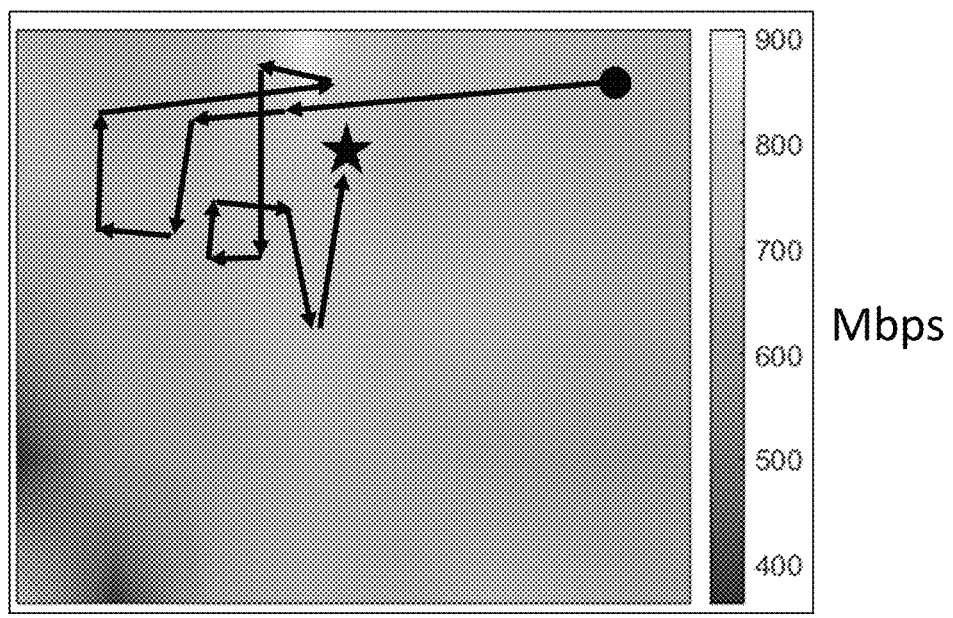
FIG. 9 schematically shows that an automatic signal deployer moves from a start point, which is at the right upper position in an indoor space and designated by a dot, and reaches an assigned position, which is designated by a star.

In other experiments, the automatic signal deployer 1 is moved to the assigned position from different start points in an indoor space. Refer to FIG. 8. In one of the experiments, the automatic signal deployer 1 moves from the start point, which is at the right lower corner and designated by a dot, and finally reaches the end point, which is the optimized deployment point and designated by a star. The arrow lines between the start point and the end point are the learning trajectories of the algorithm. The transmission rate is about 900 Mbps at the end point. Refer to FIG. 9. In another experiment, the automatic signal deployer 1 moves from the start point, which is at the right upper corner and designated by a dot, and finally reaches the end point, which is also the optimized deployment point. The transmission rate is also about 900 Mbps at the end point.

It should be explained herein: in the experiments of the present invention, the deployment agent 2 is connected with the user devices 4 through optical fiber. However, the user devices 4 may be wirelessly connected with the deployment agent 2 in practical application. The deployment agent 2 is disposed in the indoor space to receive the signal quality data of the user devices 4. In some embodiments, the deployment agent 2 is divided into a computing unit and a transmitting unit. The computing unit is connected with the base station 3, receiving signal quality data from the base station 3 and generating behavior control signals through the multi-agent reinforcement learning algorithm. The computing unit sends the behavior control signals to the transmitting unit, and the transmitting unit transmits the behavior control signals to the automatic signal deployer 1. Such a measure has advantages: 1. The telecommunication industries may collect all the signal quality data so as to verify the signal qualities of the indoor environments; 2. The transmitting unit needn't perform computation, whereby is reduced the volume of the apparatus and decreased the power consumed by computation, wherefore the telecommunication industries can afford the power consumption of computation.

In conclusion, the present invention proposes an automatic signal deployer, a signal deployment system, a signal path automatic deployment method, and a behavior control signal generation method of a deployment agent. The present invention is to optimize the performance indexes of one or more pieces of signal quality data, such as Throughput, RSSI, BER, PER, and PDR to satisfy the requirement of communication systems. Considering a plurality of behaviors of the automatic signal deployer 1 and the constraint of the certainty of the behaviors, a multi-agent reinforcement learning algorithm is designed to search for an optimal solution in the action space, whereby to optimize one or more performance indexes. In the specification, the embodiment of optimizing a single performance index of throughput is used to exemplify the present invention. However, the present invention is not limited by the embodiment. In the present invention, one or more optimized performance indexes or several front ones of the acceptable performance indexes may be used as the signal quality data, such as Throughput, RSSI, and BER. In a preferred embodiment, two acceptable ones of Throughput, RSSI, and BER are used as the signal quality data of the automatic signal deployer 1.

In the present invention, the signal deployment system uses the plug-and-play automatic signal deployer 1 to evaluate the transmission performance of the base station 3 with the automatic signal deployer 1 disposed indoors. The present invention can give telecommunication operators, device manufacturers, and telecommunication industries the following advantages:

1. The deployment cost of the present invention is lower than the small base station of the 5G communication system. The lower cost may increase the signal coverage and realize a Gbps-scale throughput.
2. The present invention is compatible with the existing communication protocol and exempted from additional modification.
3. The present invention can decrease manpower requirement.
4. The algorithm of the present invention can eliminate unnecessary measurement points in different environments and makes deployment fast and correct.
5. The present invention can plug-and-play fast, neither requiring high-performance computation resource nor spending too much cost in training deep-learning models.
6. In the present invention, some base stations may be closed in the idle time, and the automatic signal deployers may provide service for different spaces. In comparison with the conventional deployment method, the present invention can decrease a lot of base stations and thus save considerable cost.
7. The application of the automatic signal deployer may be extended to the fields of intelligent services, networks, etc., such as intelligent storages, private networks, WiFi deployment, and wireless resource management.

The embodiments described above are only to exemplify the present invention but not to limit the scope of the present invention. The embodiments involving equivalent replacement or variation made easily according to the technical contents disclosed by the specification or claims are to be also included by the scope of the present invention.

What is claimed is:

1. A behavior control signal generation method of a deployment agent comprising steps:
   receiving signal quality data, which includes a plurality of pieces of signal quality information;
   determining whether a quantity of the plurality of pieces of signal quality information reaches a preset value;
   if the quantity of the plurality of pieces of signal quality information reaches the preset value, using a signal average, which is calculated from the plurality of pieces of signal quality information, as a reward value of a plurality of sub-agents of a multi-agent reinforcement learning algorithm;

making the plurality of sub-agents use the reward value generate a behavior control signal through the multi-agent reinforcement learning algorithm and send out the behavior control signal;

receiving new signal quality data after an automatic signal deployer transmits a source signal, which comes from a base station, to a direction of signal path allocation according to the behavior control signal; and stopping sending out the behavior control signal after new signal quality signal data achieve a deployment requirement.

2. The behavior control signal generation method of a deployment agent according to claim 1, wherein before the new signal quality data reach the deployment requirement, the deployment agent resumes to undertake the steps beginning from the step of receiving the signal quality data until the new signal quality data reach the deployment requirement.

3. The behavior control signal generation method of a deployment agent according to claim 1, wherein the behavior control signal includes one of carrier behavior signals, behavior adjusting signals and mode adjusting signals, or a combination thereof;

the carrier behavior signals include a move-forward instruction, a move-backward instruction, a move-leftward instruction, a move-rightward instruction, and a stop-moving instruction for a self-propelled carrier of the automatic signal deployer;

the mode adjusting signals include one of a reflect-mode signal, a refract-mode signal and a relay transmission-mode signal, or a combination thereof for a signal path redistributor on the self-propelled carrier of the automatic signal deployer;

the behavior adjusting signals include azimuth angle adjusting information, elevation angle adjusting information, and height adjusting information; the azimuth angle adjusting information is used to increase or decrease an azimuth angle of the signal path redistributor; the elevation angle adjusting information is used to increase or decrease an elevation angle of the signal path redistributor; the height adjusting information is used to increase or decrease a height of the signal path redistributor.

4. A signal deployment system comprising:

a base station, sending out a source signal;

a deployment agent, receiving signal quality data, generating a behavior control signal according to the signal quality data, and sending out the behavior control signal; and an automatic signal deployer, receiving the behavior control signal and the source signal, moving to an assigned position according to the behavior control signal, switching to one of a reflection mode, a refraction mode and a relay transmission mode, or simultaneously switching to more than two of the reflection mode, the refraction mode and the relay transmission mode, adjusting a signal path allocation direction, and sending the source signal toward the signal path allocation direction.

5. The signal deployment system according to claim 4, wherein the deployment agent receives the signal quality data through a user device or receives the signal quality data through the base station.

6. The signal deployment system according to claim 4, wherein the signal quality data contain a plurality of pieces of signal quality information, including Received-Signal Strength Indicator (RSSI), Signal-to-Noise Ratio (SNR), Signal to Interference plus Noise Ratio (SINR), Reference Signal Received Power (RSRP), Reference Signal Received Quality (RSRQ), Bit Error Rate (BER), Packet Error Rate (PER), and Packet Drop Rate (PDR).

7. The signal deployment system according to claim 6, wherein the deployment agent contains a multi-agent reinforcement learning algorithm; the multi-agent reinforcement learning algorithm includes a plurality of sub-agents; the deployment agent uses the plurality of pieces of signal quality information to calculate a signal average value and uses the signal average value as a reward value of the plurality of sub-agents of the deployment agent; the deployment agent makes the plurality of sub-agents use the reward value to generate the behavior control signal and sends out the behavior control signal; after the automatic signal deployer transmits the source signal to the signal path allocation direction, the deployment agent receives new signal quality data; after the new signal quality data reach a deployment requirement, the deployment agent stops sending out the behavior control signal.

8. The signal deployment system according to claim 5, wherein after the deployment agent has received the new signal quality data and before the new signal quality data reach the deployment requirement, the deployment agent receives new signal quality data again and sends out a new behavior control signal until the new signal quality data reach the deployment requirement.

9. An automatic signal path deployment method, which is applied to a signal deployment system containing an automatic signal deployer, a deployment agent and a base station comprising steps:

using the deployment agent to receive signal quality data, including a plurality of signal quality signals;

using the deployment agent generates a behavior control signal according to the plurality of signal quality signals and send out the behavior control signal;

using the automatic signal deployer to receive the behavior control signal, moving the automatic signal deployer to an assigned position according to the behavior control signal, and adjusting a signal path allocation direction according to the behavior control signal; and using the automatic signal deployer to transmit a source signal, which comes from the base station, to the signal path allocation direction.

10. An automatic signal deployer comprising:

a self-propelled carrier;

a signal path redistributor;

a multidirectional adjusting device, connected with the signal path redistributor and the self-propelled carrier;

a wireless transceiver, receiving a behavior control signal and transmitting the behavior control signal; and a controller, connected with the self-propelled carrier, the multidirectional adjusting device and the wireless transceiver, receiving the behavior control signal, analyzing the behavior control signal to generate one of a carrier behavior signal, a behavior adjusting signal and a mode adjusting signal, or a combination thereof, transmitting the carrier behavior signal to the self-propelled carrier, transmitting the mode adjusting signal to the signal path redistributor, and transmitting the behavior adjusting signal to the multidirectional adjusting device, wherein the self-propelled carrier moves in a space according to the carrier behavior signal; the signal path redistributor switches to one of a reflection mode, a refraction mode and a relay transmission mode or simultaneously switches to more than two of them according to the mode adjusting signal; the multidirectional adjusting device adjusts a signal path allocation direction of the signal path redistributor according to the behavior adjusting signal to enable the signal path redistributor to send the source signal toward the signal path allocation direction.

11. The automatic signal deployer according to claim 10, wherein the behavior adjusting signal includes azimuth angle adjusting information, elevation angle adjusting information, and height adjusting information; the multidirectional adjusting device includes an azimuth angle adjuster, an elevation angle adjuster, and a height lifter; one end of the height lifter is connected with the self-propelled carrier; another end of the height lifter is connected with the azimuth angle adjuster; the elevation angle adjuster is connected with the azimuth angle adjuster; the azimuth angle adjuster is connected with the signal path redistributor; the height lifter receives the height adjusting information and adjusts a height of the signal path redistributor according to the height adjusting information; the azimuth angle adjuster receives the azimuth angle adjusting information and adjusts an azimuth angle of the signal path redistributor according to the azimuth angle adjusting information; the elevation angle adjuster receives the elevation angle adjusting angle and adjusts a elevation angle of the signal path redistributor according to the elevation angle adjusting information.

* * * * *